United States Patent
Kumagai (10) Patent No.: US 10,088,570 B2
(45) Date of Patent: Oct. 2, 2018

(54) LASER SCANNER SYSTEM

(71) Applicant: Kabushiki Kaisha TOPCON, Tokyo-to (JP)

(72) Inventor: Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 452 days.

(21) Appl. No.: 14/725,382

(22) Filed: May 29, 2015

(65) Prior Publication Data

US 2015/0355331 A1 Dec. 10, 2015

(30) Foreign Application Priority Data

Jun. 4, 2014 (JP) .................................. 2014-116088

(51) Int. Cl.
| | | |
|---|---|---|
| *G01S 17/87* | (2006.01) | |
| *G01S 7/481* | (2006.01) | |
| *G01S 17/42* | (2006.01) | |
| *G01S 17/89* | (2006.01) | |

(52) U.S. Cl.
CPC ............ *G01S 17/87* (2013.01); *G01S 7/4817* (2013.01); *G01S 17/42* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 5,495,337 | A * | 2/1996 | Goshorn | G01N 21/956 348/126 |
| 7,969,558 | B2 * | 6/2011 | Hall | G01S 7/4813 356/141.5 |
| 2008/0075325 | A1 | 3/2008 | Otani et al. | |
| 2012/0013917 | A1 | 1/2012 | Ohtomo et al. | |
| 2013/0229645 | A1 * | 9/2013 | Suzuki | G01S 17/02 356/5.01 |
| 2014/0240691 | A1 * | 8/2014 | Mheen | G01S 17/89 356/4.07 |

(Continued)

FOREIGN PATENT DOCUMENTS

| | | |
|---|---|---|
| DE | 102011053212 B3 | 10/2012 |
| JP | 2002-31528 A | 1/2002 |

(Continued)

OTHER PUBLICATIONS

European communication dated Nov. 9, 2015 in corresponding European patent application No. 15170355.0.

(Continued)

*Primary Examiner* — Charlie Y Peng
(74) *Attorney, Agent, or Firm* — Nields, Lemack & Frame, LLC (57) ABSTRACT

The invention provides a laser scanner system, which comprises two or more laser scanners installed on a movable object and a main control device, wherein the laser scanner is arranged as a TOF type which performs distance measurement by rotary projection of a pulsed light, and wherein the main control device produces a selection signal, the laser scanner, which is alternately selected based on the selection signal, performs distance measurement by emitting a pulsed light, wherein the laser scanner, which performs distance measurement at the same time, is a selected one.

7 Claims, 6 Drawing Sheets

(56) References Cited

U.S. PATENT DOCUMENTS

| | | | | |
|---|---|---|---|---|
| 2015/0131080 A1* | 5/2015 | Retterath | ................ | G01S 17/10 |
| | | | | 356/5.01 |
| 2015/0331111 A1* | 11/2015 | Newman | ................ | G01S 17/58 |
| | | | | 356/4.01 |
| 2016/0044240 A1* | 2/2016 | Beers | ...................... | G06T 3/005 |
| | | | | 348/36 |

FOREIGN PATENT DOCUMENTS

| | | |
|---|---|---|
| JP | 2008-76303 A | 4/2008 |
| JP | 2012-21949 A | 2/2012 |
| JP | 2013-113670 A | 6/2013 |

OTHER PUBLICATIONS

Thrun, et al., "Stanley: The Robot that Won the DARPA Grand Challenge", Journal of Field Robotics, vol. 23, No. 9, pp. 661-692, Sep. 1, 2006.
Sick AG, "LMS200/211/221/291 Laser Measurement Systems", Jan. 1, 2006, 48 pages.

\* cited by examiner

FIG.7A SELECTION SIGNAL

FIG.7B SCANNER A

FIG.7C SCANNER B

FIG.7D SCANNER A

FIG.7E SCANNER B

LASER SCANNER SYSTEM

BACKGROUND OF THE INVENTION

The present invention relates to a laser scanner system, which has a plurality of scanners and acquires point cloud data in a wide range.

As one of the usage methods of a laser scanner, a method is known, in which laser scanners are installed on a movable object such as an automobile and acquire point cloud data of a predetermined range along a moving line. A point cloud data thus acquired is used as a map data of a navigation system or is used for measuring a shape of building structure or is used as a data for judging a condition of a road surface.

As one of the laser scanners, there is a laser scanner of TOF (TIME OF FLIGHT) type. The laser scanner emits a laser beam (a distance measuring light) by pulsed emitting, measures a distance of a projecting point (a measuring point) per each pulsed light by receiving a reflected light and based on a time required for a round trip of the pulsed light, and further, by scanning the laser beam within a range as required, point cloud data are acquired.

Conventionally, in a case where a laser scanner is installed on a movable object, e.g. an automobile, the laser scanner is installed at a part where a visual field from the automobile is opened, e.g. one laser scanner is installed on a ceiling of the automobile, the emitted laser beam is scanned in a direction crossing a moving line, and the point cloud data within a predetermined range along the moving line is acquired.

In a case where the point cloud data are acquired by the laser scanner installed on the automobile, it is desirable that the automobile runs at the same speed as other vehicles. Further, in order to improve the measurement accuracy, it is desirable that the point cloud data are becoming denser. On the other hand, the density of the acquired point cloud data is determined by a scanning speed of the laser beam, a moving speed of the automobile and a light emission frequency of the pulsed light.

Therefore, in order that a predetermined point cloud data density is satisfied under the condition where high density of the point cloud data is required, an increase of the light emission frequency is required. However, because of a restriction on a duty of a light emitting source, the increase of the light emission frequency is limited, and there have been problems where demands of a higher moving speed and a higher density of the point cloud data may have not been fulfilled sufficiently.

SUMMARY OF THE INVENTION

It is an object of the present invention to provide a laser scanner system, by which it is possible to increase a moving speed and to have a higher density of the point cloud data.

To attain the object as described above, a laser scanner system according to the present invention comprises two or more laser scanners installed on a movable object and a main control device, wherein the laser scanner is arranged as a TOF type which performs distance measurement by rotary projection of a pulsed light, and wherein the main control device produces a selection signal, the laser scanner, which is alternately selected based on the selection signal, performs distance measurement by emitting a pulsed light, wherein the laser scanner, which performs distance measurement at the same time, is a selected one.

Further, in the laser scanner system according to the present invention, the laser scanner has a distance measuring unit, wherein the distance measuring unit has a light emitting source for emitting a pulsed light and a distance measuring light detector for receiving a reflection light from an object to be measured, and the distance measuring unit makes the light emitting source to emit based on the selection signal and restricts the distance measuring light detector so as to detect the reflection light only for a predetermined time period from the selection signal.

Further, in the laser scanner system according to the present invention, the laser scanner comprises a rotary projecting unit for projecting a pulsed laser beam in rotary irradiation, and the main control device produces the selection signal so that the pulsed light has such light emission period corresponding to a rotation speed of the rotary projecting unit.

Further, in the laser scanner system according to the present invention, the selection signal is produced, which sets a light emission period of a pulsed light so that a density of an acquired point cloud data become a predetermined value, by corresponding a moving speed of the movable object and a rotating speed of the rotary projecting unit.

Furthermore, in the laser scanner system according to the present invention, the distance measuring unit has two or more light emitting sources and is configured so that light emission of the light emitting source is alternately selected based on the selection signal.

According to the present invention, the laser scanner system comprises two or more laser scanners installed on a movable object and a main control device, wherein the laser scanner is arranged as a TOF type which performs distance measurement by rotary projection of a pulsed light, and wherein the main control device produces a selection signal, the laser scanner, which is alternately selected based on the selection signal, performs distance measurement by emitting a pulsed light, wherein the laser scanner, which performs distance measurement at the same time, is a selected one. As a result, interference between the laser scanners can be avoided, the acquisition of the point cloud data by a plurality of laser scanners become possible, and it becomes possible to increase the moving speed and increase the density of the point cloud data.

Further, according to the present invention, in the laser scanner system, the laser scanner has a distance measuring unit, wherein the distance measuring unit has a light emitting source for emitting a pulsed light and a distance measuring light detector for receiving a reflection light from an object to be measured, and the distance measuring unit makes the light emitting source to emit based on the selection signal and restricts the distance measuring light detector so as to detect the reflection light only for a predetermined time period from the selection signal. As a result, interference between the laser scanners are even more avoided and acquisition of the point cloud data with higher accuracy becomes possible.

Further, according to the present invention, in the laser scanner system, the laser scanner comprises a rotary projecting unit for projecting a pulsed laser beam in rotary irradiation, and the main control device produces the selection signal so that the pulsed light has such light emission period corresponding to a rotation speed of the rotary projecting unit. As a result, it is possible to obtain the point cloud data having the pitch interval as desired.

Further, according to the present invention, in the laser scanner system, the selection signal is produced, which sets a light emission period of a pulsed light so that a density of an acquired point cloud data become a predetermined value, by corresponding a moving speed of the movable object and a rotating speed of the rotary projecting unit. As a result, it is possible to acquire point cloud data having the density as desired.

Furthermore, according to the present invention, in the laser scanner system, the distance measuring unit has two or more light emitting sources and is configured so that light emission of the light emitting source is alternately selected based on the selection signal. As a result, distance measurement can be performed by using even more pulsed lights and point cloud data with higher density can be acquired.

DETAILED DESCRIPTION OF THE PREFERRED EMBODIMENT

Description will be given below on an embodiment of the present invention by referring to the attached drawings.

Figure 1:
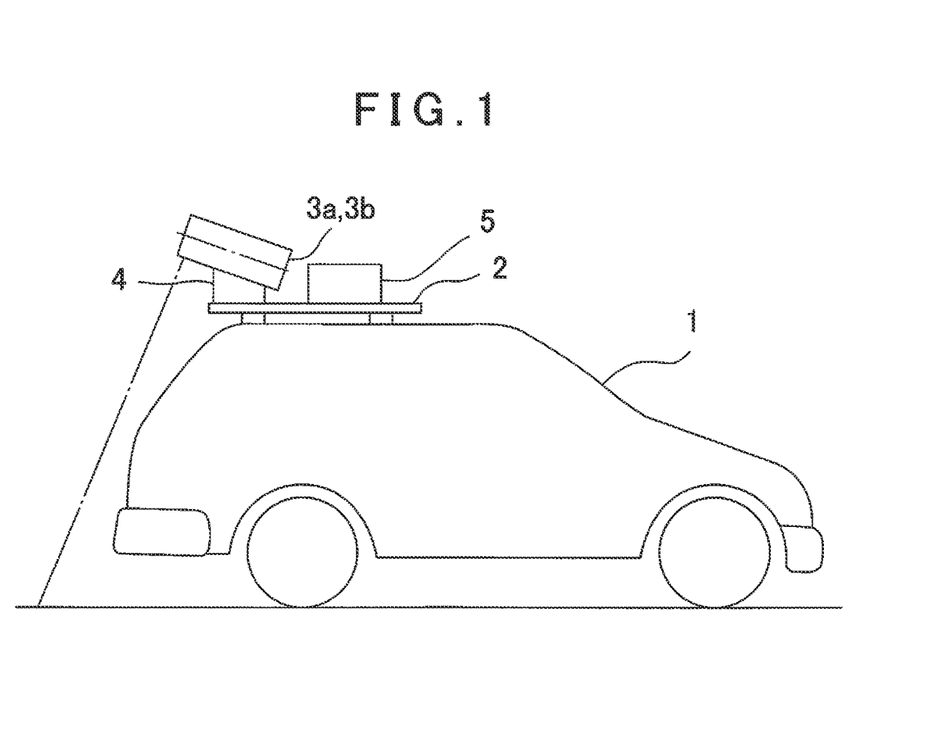
FIG. 1 is a schematical side view to show an automobile where a laser scanner system according to an embodiment of the present invention is installed.
Figure 2:
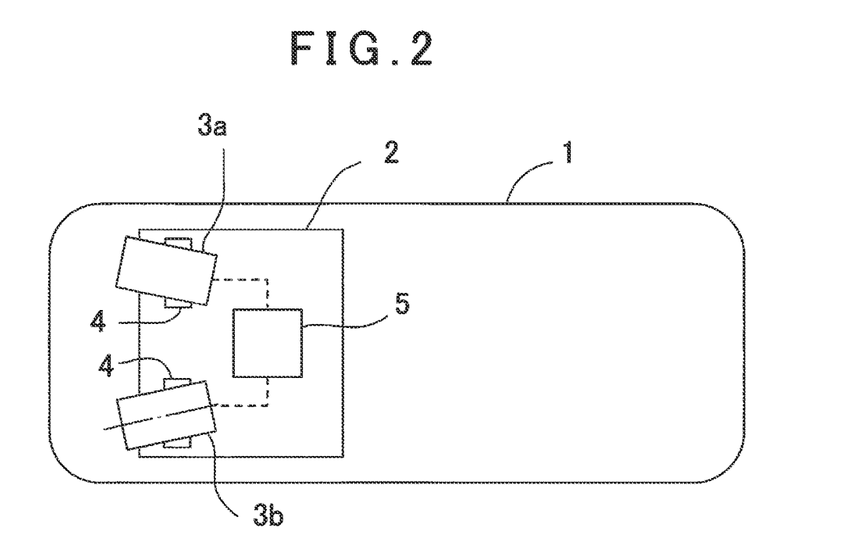
FIG. 2 is a plan view of the automobile as described above.

First, by referring to FIG. 1 and FIG. 2, description will be given on general features of an embodiment of the invention.

In the present embodiment, an automobile is used as a movable object. A fixing base 2 is installed on an upper surface of an automobile 1 and two laser scanners 3a and 3b of TOF type are provided on the fixing base 2. The laser scanners 3a and 3b are installed on the fixing base 2 via a mount 4 in a condition where the laser scanners 3a and 3b are tilted with respect to the horizontal direction respectively. Further, a main control device 5 is installed on the automobile 1, and operations of the laser scanners 3a and 3b are controlled by the main control device 5.

Each of the laser scanners 3a and 3b emits a laser beam of pulsed light in rearward direction with respect to advancing direction of the automobile 1 and the laser beam is scanned within a range as required in horizontal direction and in up-and-down direction respectively.

The laser scanners 3a and 3b individually scan the laser beams respectively and individually obtain the point cloud data respectively. Further, the laser scanners 3a and 3b are controlled respectively by the main control device 5 so that one of distance measuring operations does not exert influence on the other distance measuring operation.

Figure 3:
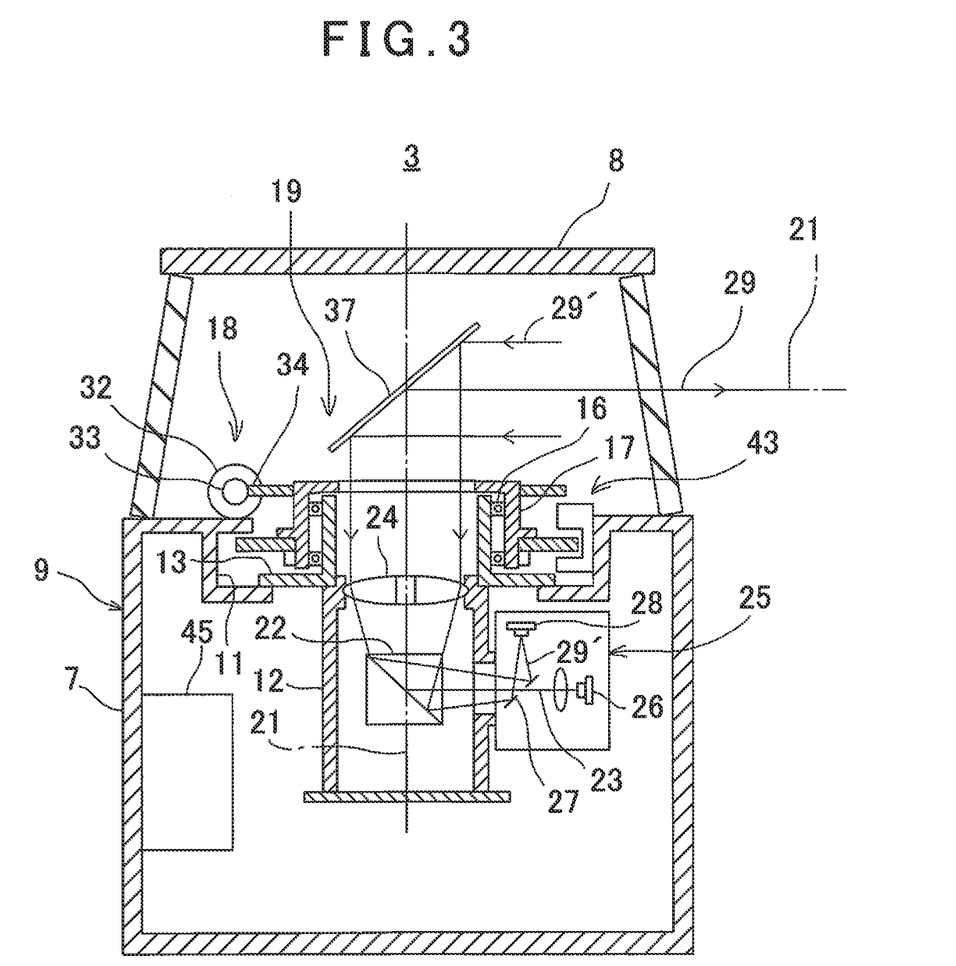
FIG. 3 is a lateral cross-sectional view of a laser scanner used in the laser scanner system.

First, referring to FIG. 3, description will be given on the laser scanners 3a and 3b. Because the laser scanner 3a and the laser scanner 3b have the same structure, a description will be given below by regarding them as a laser scanner 3. Further, although a center line of the laser scanner 3 is shown in a vertical direction in FIG. 3, the laser scanner is set in lateral direction when installed on the fixing base 2, and the laser scanner 3 is arranged in a condition where the center line is tilted with respect to the horizontal direction and further tilted with respect to the advancing direction.

A main unit case 7 is fixed on the mount 4, and an upper cover 8 is air-tightly mounted on an upper surface of the main unit case 7. The main unit case 7 and the upper cover 8 make up together a casing 9 with an air-tight structure.

At a center of an upper surface of the main unit case 7, a recessed portion 11 is formed in downward direction and a body tube (lens barrel) 12 is provided at a center portion of the recessed portion 11 so as to penetrate in up-and-down direction. A flange 13 is formed on the body tube 12 and the flange 13 is fixed to the bottom of the recessed portion 11.

On an upper end of the body tube 12, a rotary base 17 is mounted via bearings 16. On the rotary base 17, a rotary mechanism unit 18 (to be described later) and a rotary projecting unit 19 (to be described later) are provided.

The body tube 12 has an optical axis 21, which coincides with the central line, and a mirror 22, as optical separating means, is provided on the optical axis 21. The mirror 22 reflects a reflected light 29'. Further, a condenser lens 24 with aperture is provided on the optical axis 21.

A distance measuring unit 25 is provided on a reflection light optical axis 23 which is deflected by the mirror 22.

A light emitting source 26 is provided on the reflection light optical axis 23, and a mirror 27 with aperture is disposed on the reflection light optical axis 23. The mirror 27 with aperture allows the reflection light optical axis 23 to pass, and further, the reflection light optical axis 23 is divided, and a distance measuring light detector 28 is provided on the divided optical axis.

The light emitting source 26 is driven by pulse, and a pulsed laser beam, which is a continuation of the pulsed light, is emitted from the light emitting source 26. The light emitting source 26 is a semiconductor laser or the like, for instance, and emits pulsed laser beam of infrared light as a distance measuring light 29, and light emission is controlled in a condition as required by a laser scanner control unit 45 (to be described later).

The pulsed laser beam 29 passes through the mirror 27 with aperture and is reflected by the mirror 22 on the optical axis 21, passes through a hole of the condenser lens 24 with aperture and is projected to the rotary projecting unit 19. Further, it is arranged so that the pulsed laser beam 29 is projected to an object to be measured via a deflection mirror 37.

The reflection light reflected by the object to be measured enters the condenser lens 24 with aperture via the rotary projecting unit 19 and the optical axis 21. The reflection light is then reflected by the mirror 27 with aperture and enters the distance measuring light detector 28. It is arranged so that one divided part of the pulsed laser beam 29 enters the distance measuring light detector 28 as an internal reference light (not shown), and arranged so that a distance to the object to be measured is measured based on the reflected distance measuring light and the internal reference light.

Description will be given on the rotary mechanism unit 18.

A rotary motor 32 is provided on an upper surface of the main unit case 7 and a rotary driving gear 33 is fitted into output shaft of the rotary motor 32. A rotary gear 34 is provided on the rotary base 17 and the rotary gear 34 is engaged with the rotary driving gear 33. It is so designed that the rotary base 17 is rotated around the optical axis 21 as the center via the rotary driving gear 33 and the rotary gear 34 by the driving of the rotary motor 32.

On an upper surface of the rotary base 17, a mirror holder (not shown) is provided, and the deflection mirror 37 as a deflection optical member is supported by the mirror holder. The deflection mirror 37 is disposed on the optical axis 21 and deflects the pulsed laser beam 29, which enters via the condenser lens 24 with aperture, in horizontal direction. The deflection mirror 37 deflects the reflection light as reflected by the object to be measured in vertical direction and then directs the reflection light toward the condenser lens 24 with aperture.

By driving the rotary motor 32, the rotary base 17 is rotated around the optical axis 21 as the center via the rotary driving gear 33 and the rotary gear 34, and the deflection mirror 37 is rotated integrally with the rotary base 17.

An angle detector 43 is provided between the rotary base 17 and the recessed portion 11, and a relative rotation angle of the rotary base 17 with respect to the main unit case 7 (the body tube 12) is detected by the angle detector 43.

The rotary motor 32, the rotary driving gear 33, the rotary gear 34, the deflection mirror 37, etc. make up together the rotary projecting unit 19.

An upper portion of the main unit case 7 is air-tightly covered by the upper cover 8 and the rotary mechanism unit 18, the rotary projecting unit 19, the angle detector 43, etc. are accommodated in the upper cover 8. Further, a circumferential surface of the upper cover 8 is transparent, and designed so that the pulsed laser beam 29 is projected through the circumferential surface so that the reflection light enters through the circumferential surface.

Inside the main unit case 7, the laser scanner control unit 45 is provided. The laser scanner control unit 45 controls for emitting light and for measuring distance in the distance measuring unit 25 and controls for scanning the pulsed laser beam 29 by the rotary mechanism unit 18 based on the result of detection by the angle detector 43.

Further, based on the result of detection by the angle detector 43, the laser scanner control unit 45 measures a rotation angle of the rotary base 17, i.e. the deflection mirror 37, acquires positional information of a measuring point by executing distance measurement and angle measurement per each pulse, and further acquires a point cloud data.

Figure 4:
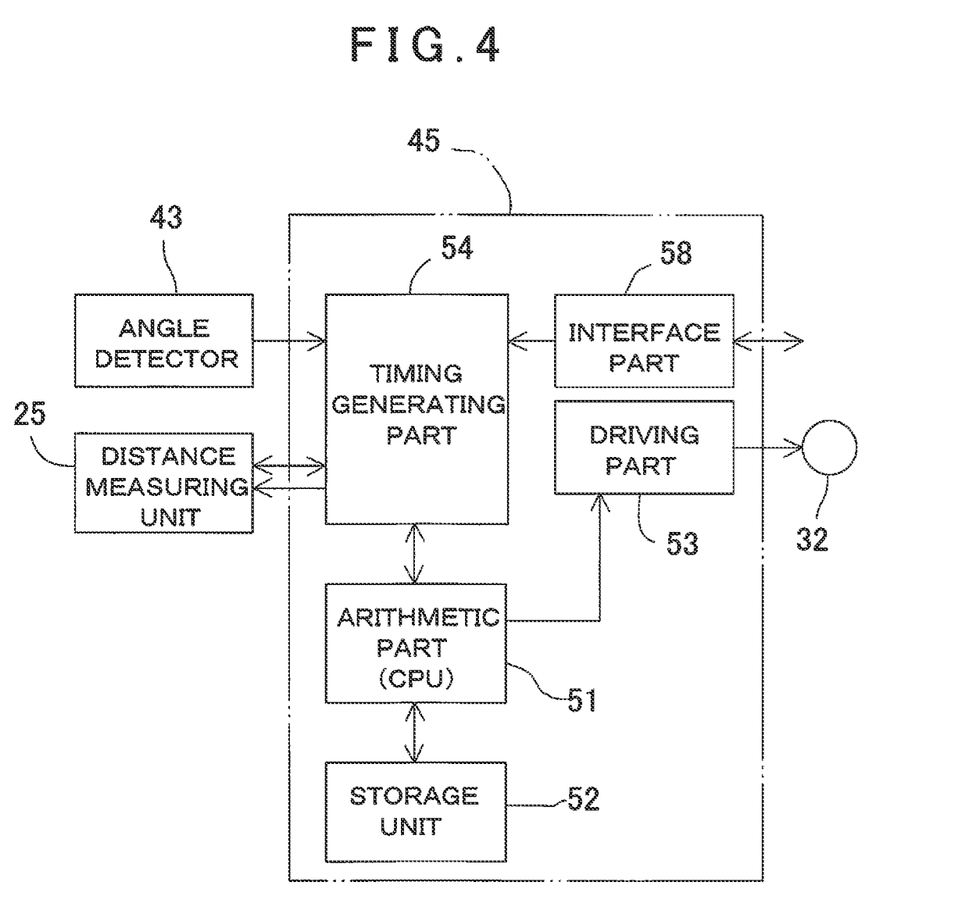
FIG. 4 is a schematical block diagram of a laser scanner control unit.

Referring to FIG. 4, description will be given on general features of a control system including the laser scanner control unit 45.

A detection signal from the angle detector 43 and a distance measurement result from the distance measuring unit 25 are inputted in the laser scanner control unit 45.

Description will be given on general features of the laser scanner control unit 45.

The laser scanner control unit 45 comprises an arithmetic part 51 represented by a CPU for processing distance data acquired by the distance measuring unit 25 and for corresponding an angle and a distance, a storage unit 52, a driving part 53 for driving and controlling the rotary motor 32, an interface part 58 for controlling input/output of signals such as control signals, data signals, etc. to and from the main control device 5, and a timing generating part 54, and the like, for generating a timing for angle detection and distance measurement.

In the storage unit 52, various types of programs are stored. These programs include: a sequence program required for detection of distance measurement and detection of rotation angle, a calculation program, a measurement data processing program for executing the processing of measurement data, a timing generating program for synchronizing the detection of distance measurement and rotation angle of the distance measuring unit 25 and a program and the like for integrally managing these programs. And further, data such as measurement data and the like are stored in the storage unit 52.

The acquisition of the point cloud data by the laser scanner 3 as a single unit is carried out as described below.

A pulsed laser beam 29 as emitted from the light emitting source 26 is reflected by the mirror 22, passes through the condenser lens 24 with aperture, is further deflected in horizontal direction by the deflection mirror 37 and is projected.

A reflection light 29' from the object to be measured enters the deflection mirror 37, is reflected by the mirror 22 and the mirror 27 with aperture and is received by the distance measuring light detector 28.

Based on the reflection light 29' as received at the distance measuring light detector 28, distance measurement is performed per each light pulse of the reflection light 29'. Further, a rotation angle at the time of detection of the light pulse is detected by the angle detector 43. Based on the distance measurement result and the rotation angle thus detected, positional data of the measuring point is acquired.

By reciprocally rotating the rotary base 17 around the optical axis 21 as the center by means of the rotary motor 32, the rotary projecting unit 19, i.e. the deflection mirror 37, is reciprocally rotated. By reciprocally rotating the deflection mirror 37, the distance measuring light 29 is reciprocally scanned at a predetermined angle. It is to be noted that the rotary base 17 may be rotated in one direction at a constant speed by the rotary motor 32.

When the automobile 1 is moved at a predetermined speed or when the deflection mirror 37 is reciprocally rotated, the distance measuring light 29 is scanned over a predetermined range, and a point cloud data of the predetermined range is acquired.

Figure 5:
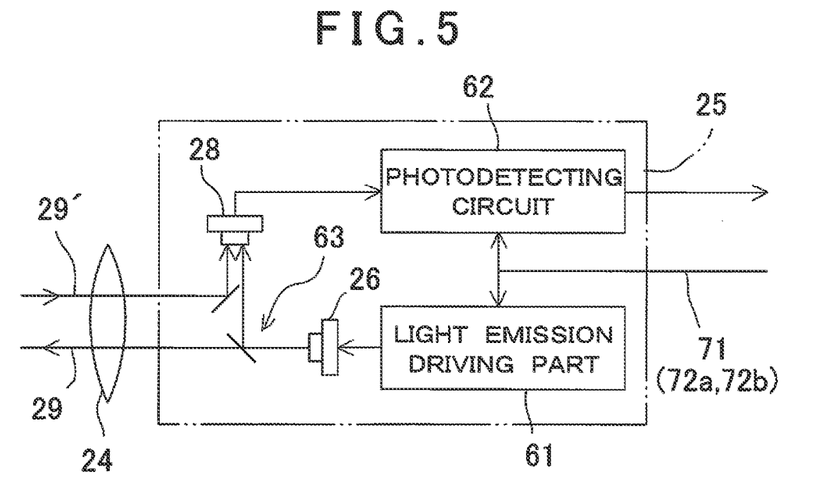
FIG. 5 is a schematical block diagram of a distance measuring unit.

Referring to FIG. 5, description will be given on general features of the distance measuring unit 25.

By a light emission driving part 61, the light emitting source 26 is made to emit and light emission period or the like are controlled. The light receiving condition of the distance measuring light detector 28 is controlled by a photodetecting circuit 62, and in a case where the distance measuring light detector 28 receives the reflection light 29', a photodetection signal is outputted to the laser scanner control unit 45 via the photodetecting circuit 62. It is to be noted that one part of the distance measuring light 29 as emitted from the light emitting source 26 enters the distance measuring light detector 28 via an internal reference light path 63 as an internal reference light. In the distance measurement based on the reflected light 29', by comparing the reflection light 29' and the internal reference light, it is possible to perform distance measurement with high accuracy.

Figure 6:
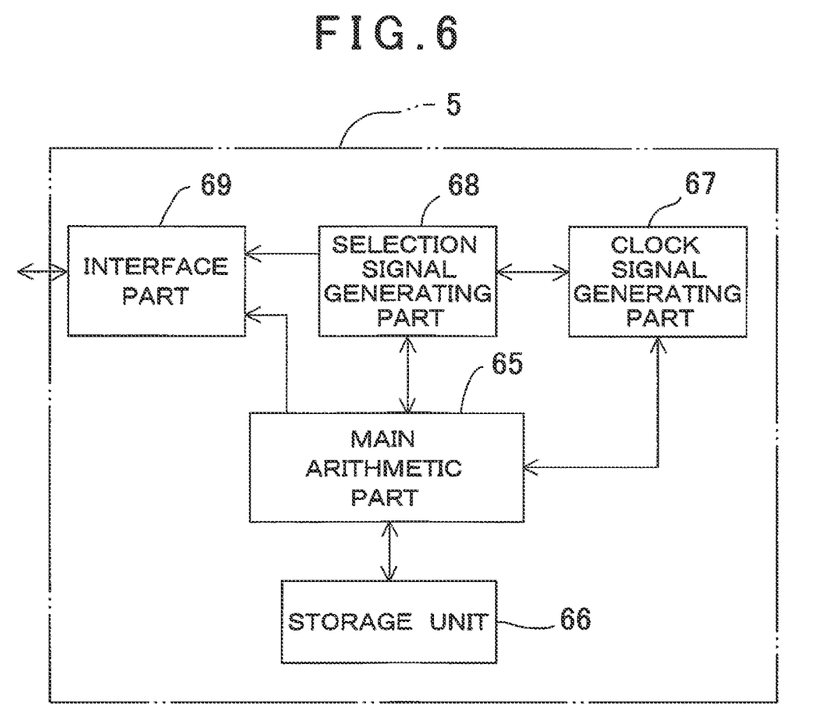
FIG. 6 is a schematical block diagram of a main control device.

Next, by referring to FIG. 6, description will be given on the main control device 5.

The main control device 5 primarily comprises a main arithmetic part 65 as represented by a CPU, a storage unit 66, a clock signal generating part 67, a selection signal generating part 68 and an interface part 69.

The clock signal generating part 67 issues a reference clock signal, and based on the reference clock signal, the selection signal generating part 68 produces a selection signal for controlling the light emission timing of the distance measuring light 29 of each of the laser scanners 3a and 3b.

The interface part 69 is for performing communication to and from the interface part 58 by the means as required such as wireless, wired communication, or the like and transmits the selection signal or a light emission control command as produced based on the selection signal to the interface part 58.

In the storage unit 66, various types of programs are stored. These programs include: a program for generating a selection signal, a communication program for performing communication of signals such as control signals, data signals, etc. to and from the interface part 58 and the interface part 69, and a program for controlling a giving and taking of the data and a data processing between the clock signal generating part 67, the selection signal generating part 68 and the interface part 69.

The main control device 5 controls light emission timing of the distance measuring light 29 of the laser scanners 3a and 3b and prevents mutual interference between the laser scanners 3a and 3b.

For instance, when a reflection light of the distance measuring light 29 emitted from one laser scanner 3a enters the other laser scanner 3b and the other laser scanner 3b performs distance measurement according to the reflection light, the result of distance measurement by the other laser scanner 3b will be erroneous. Therefore, the main control device 5 controls a light emission timing of the distance measuring light 29 of each of the laser scanners 3a and 3b and the laser scanners 3a and 3b can carry out the distance measurement only according to the reflection light of the rotary projecting unit 19 as emitted by themselves respectively.

Referring to FIG. 7, description will be given on an operation of the main control device 5.

Figure 7A:
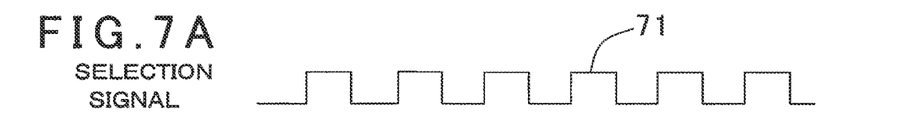
FIG. 7A, FIG. 7B and FIG. 7C are drawings to explain a selection signal for controlling light emission timing of two laser scanners.

FIG. 7A shows a selection signal 71 produced based on a reference clock signal by the selection signal generating part 68, and the selection signal 71 is a rectangular wave with an equal time interval. Further, the period of the selection signal 71 is set in such a manner that a restriction of the load factor of the light emitting source 26 is fulfilled and that the period will be in a time interval corresponding to a distance to be measured.

Figure 7B:
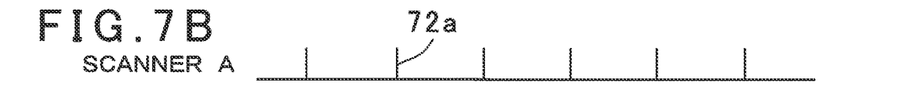

Based on the selection signal 71, light emission signals 72a and 72b for the laser scanners 3a and 3b are produced (See FIG. 7A and FIG. 7B).

The light emission signal 72a with respect to the laser scanner 3a is generated at the timing of a starting edge of the selection signal 71, and the light emission signal 72b with respect to the laser scanner 3b is generated at the timing of a stopping edge of the selection signal 71. Therefore, the laser scanners 3a and 3b emit pulses alternately under the condition where restriction of the load factor of the light emitting source 26 will be fulfilled.

Further, the time interval between the light emission signal 72a of the laser scanner 3a and the light emission signal 72b of the laser scanner 3b is set so as to satisfy the time corresponding to the distance to be measured. That is, the time interval between the light emission signal 72a and the light emission signal 72b is longer than a distance measuring time by one pulsed light. Under such setting, for instance, there is no chance that the reflection light of the distance measuring light 29 as emitted from the laser scanner 3a enters the laser scanner 3b after the light emission signal 72b of the laser scanner 3b.

Figure 7C:
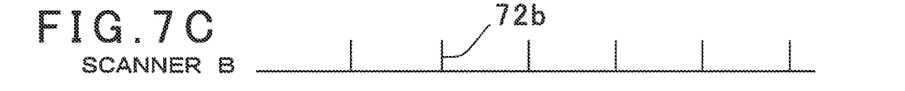

The light emission signals 72a and 72b are transmitted from the interface part 69 to each of the interface parts 58 as a light emission synchronizing signal of each of the distance measuring units 25 of the laser scanners 3a and 3b. In a case where the light emission signal 72a is issued, only the laser scanner 3a emits the pulsed light and performs distance measurement. In a case where the light emission signal 72b is issued, only the laser scanner 3b emits the pulsed light and performs distance measurement. Therefore, the light emission signals 72a and 72b are synchronization signals for light emission and distance measurement of the laser scanners 3a and 3b, and also, has the function as a selection signal to select which of the laser scanners 3a and 3b should be operated.

Each of the light emission signals 72 is inputted respectively to the light emission driving part 61 and the photodetecting circuit 62 of the distance measuring unit 25 via the laser scanner control unit 45.

The light emission driving part 61 is operated so that the light emitting source 26 emits pulsed light based on the light emission signal 72 and the photodetecting circuit 62 is operated so that a detection timing of the reflection light 29' is controlled based on the light emission signal 72.

It is to be noted that it may be arranged in such a manner that the selection signal 71 is transmitted from the main control device 5 to the laser scanner 3 and that the light emission signals 72a and 72b are produced by the laser scanner control unit 45.

That is, the main control device 5 transmits the selection signal 71 from the interface part 69 to the interface part 58 with respect to each of the laser scanners 3 respectively and produces the light emission signal 72 based on the selection signal 71 by the laser scanner control unit 45. The light emission signal 72 is inputted to the distance measuring unit 25, a pulsed light emission of the light emitting source 26 is controlled based on the light emission signal 72, and the detection of the photodetecting circuit 62 is controlled.

The laser scanner control unit 45 controls photodetecting conditions of the distance measuring light detector 28, and controls in such a manner that a distance measurement is performed by judging the reflection light 29' first received from the moment when the light emission signal is issued as a reflection light of the distance measuring light 29 issued by itself. By this judgment, it is possible to reliably prevent erroneous measurement based on the reflection light with respect to the other laser scanner 3.

Figure 7D:
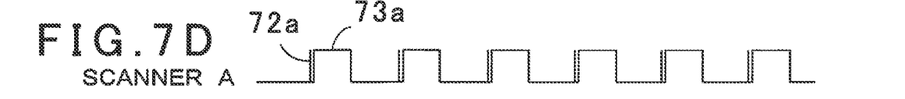
FIG. 7D and FIG. 7E are drawings to explain a masking which restrict a detection of reflection light of each of the laser scanners.
Figure 7E:
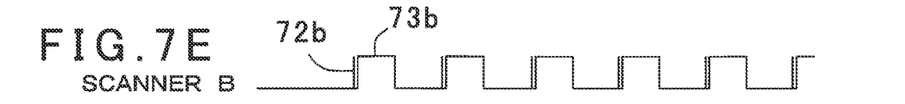
Figure 8A:
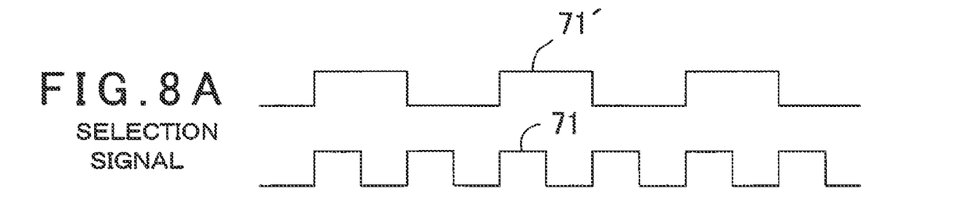
FIG. 8A, FIG. 8B, FIG. 8C, FIG. 8D and FIG. 8E are drawings to explain selection signals for controlling light emission timing of four laser scanners.
Figure 8B:
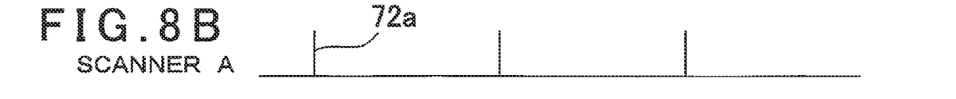
Figure 8C:
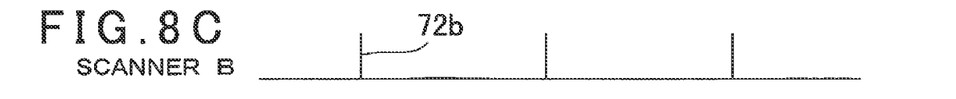
Figure 8D:
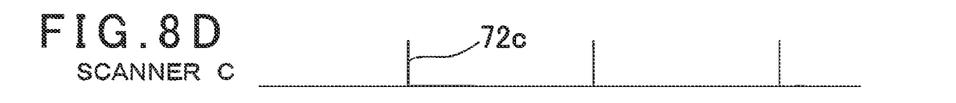
Figure 8E:
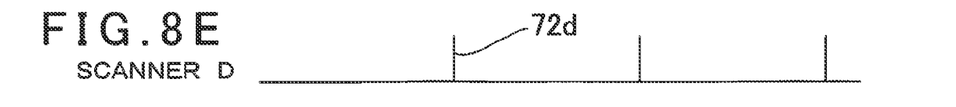

FIG. 7D and FIG. 7E shows a method of distinguishing the reflection light 29' in order to prevent erroneous measurement more reliably.

In the distinguishing method as shown in FIG. 7D and FIG. 7E, a time to detect the reflection light 29' is limited with respect to the distance measuring light detectors 28 of the laser scanners 3a and 3b. That is, maskings 73a and 73b are carried out with respect to the distance measuring light detector 28 and the detection of the reflection light 29' is restricted.

For instance, in the laser scanner 3a, when the light emission signal 72a is inputted to the photodetecting circuit 62, the photodetecting circuit 62 can detect the reflection light 29' only during the period from the moment of input of the light emission signal 72a to the moment when the light emission signal 72b is issued. Similarly, in the laser scanner 3b, the photodetecting circuit 62 can detect the reflection light 29' only during the time from the issuing of the light emission signal 72b to the issuing of the light emission signal 72a.

With respect to the distance measuring light detector 28 of each of the laser scanner 3a and the laser scanner 3b, by carrying out the maskings 73a and 73b at different timing and in such a manner that detectable ranges do not overlap, it is possible to reliably prevent the interference between the laser scanners 3a and 3b and to prevent erroneous measurement.

Next, under the condition where the laser scanners 3a and 3b are installed on the automobile 1, the optical axis 21, i.e. the rotation center of the rotary projecting unit 19, is tilted with respect to the horizontality and is also tilted with respect to the advancing direction. Therefore, the distance measuring light 29 emitted from the deflection mirror 37 is emitted in rotary projection within a plane, which is tilted with respect to the advancing direction.

The density of the point cloud data obtained by the laser scanners 3a and 3b is determined by light emitting period of the puled light, by the rotating speed of the deflection mirror 37 driven by the rotary motor 32 and by the moving speed of the automobile 1 where the laser scanners 3 are installed.

The light emitting period of the pulsed light is determined by the setting of the period of the selection signal 71. Therefore, by taking the rotating speed of the deflection mirror 37 into consideration and by determining the light emitting period, a light emitting pitch (light emitting interval) in rotating direction of the distance measuring light 29 can be set up. Further, by taking the rotating speed of the deflection mirror 37 and the moving speed of the automobile 1 into consideration, a pitch in the moving direction can be set up.

Therefore, by appropriately setting up the light emitting period, the rotation speed of the deflection mirror 37 and the moving speed of the automobile 1, it is possible to set up the density of the point cloud data to a condition as desired, for instance, to set up the density of the point cloud data to a constant level. It is to be noted that as for the moving speed of the automobile 1, the laser scanner system may be provided with a speed detector, or a speed signal may be obtained from a speedometer installed on the automobile 1.

In FIG. 7A to FIG. 7C as described above, a selection signal 71 produced with respect to the two laser scanners 3 is shown, while it is possible to control light emission of even more laser scanners 3 by produced selection signals with different periods and by combining selection signals with different periods.

For instance, FIG. 8A to FIG. 8E shows a selection signal 71 produced with respect to each of four laser scanners 3.

By producing a selection signal 71' having a period which is twice as long with respect to a selection signal 71, and by combining HIGH and LOW of the two selection signals 71 and 71', the light emission signals 72a, 72b, 72c and 72d are generated. By using the light emission signals 72a, 72b, 72c and 72d, light emission of four laser scanners 3 can be controlled. Further, as for the masking of the distance measuring light detector 28, it would suffice if detection is possible only between the photodetection signals 72, which are adjacent to each other in terms of time. For instance, in a scanner A, masking of a light emitting source 26 of the scanner A should be performed so that detection is possible only between the light emission signal 72a and the light emission signal 72b.

It is to be noted that it may be so arranged that a selection signal 71" having a period of ½ times as long with respect to the selection signal 71 is produced and by combining HIGH and LOW of the two selection signals 71 and 71", the light emission signals 72 are produced.

Further, although one light emitting source is provided with respect to one laser scanner 3 in the embodiment as described above, it may be so arranged that a plurality of light emitting sources are provided with respect to one laser scanner 3 and the plurality of light emitting sources emit light alternately using the selection signal 71.

The invention claimed is:

1. A laser scanner system, comprising two or more laser scanners installed on a movable object and a main control device, wherein said laser scanner is arranged as a TOF type which performs distance measurement by rotary projection of a pulsed light, and wherein said main control device produces a selection signal which selects said laser scanners per each light emission of the pulsed light, said laser scanner, which is alternately selected based on said selection signal, performs distance measurement by emitting the pulsed light, wherein said laser scanner, which receives a reflected pulsed light from one projecting point and performs distance measurement at the same time, is a selected one, wherein said laser scanner has a distance measuring unit, and wherein said distance measuring unit has a light emitting source for emitting the pulsed light and a distance measuring light detector for receiving a reflection light from an object to be measured, and said distance measuring unit makes said light emitting source to emit based on said selection signal and said main control device is configured to restrict said distance measuring light detector so as to detect said reflection light from said selection signal until a next selection signal is issued.

2. A laser scanner system according to claim 1, wherein said laser scanner comprises a rotary projecting unit for projecting a pulsed laser beam in rotary irradiation, and said main control device produces said selection signal so that the pulsed light has a light emission period corresponding to a rotation speed of said rotary projecting unit.

3. A laser scanner system according to claim 1, wherein said selection signal is produced, which sets a light emission period of a pulsed light so that a density of an acquired point cloud data becomes a predetermined value, by corresponding a moving speed of said movable object and a rotating speed of said rotary projecting unit.

4. A laser scanner system according to claim 1, wherein said distance measuring unit has two or more light emitting sources and is configured so that light emission of said light emitting source is alternately selected based on said selection signal.

5. A laser scanner system according to claim 1, wherein said laser scanner comprises a rotary projecting unit for projecting a pulsed laser beam in rotary irradiation, and said main control device produces said selection signal so that the pulsed light has a light emission period corresponding to a rotation speed of said rotary projecting unit.

6. A laser scanner system according to claim 1, wherein said selection signal is produced, which sets a light emission period of a pulsed light so that a density of an acquired point cloud data becomes a predetermined value, by corresponding a moving speed of said movable object and a rotating speed of said rotary projecting unit.

7. A laser scanner system, comprising two or more laser scanners installed on a movable object and a main control device, wherein said laser scanner is arranged as a TOF type which performs distance measurement by rotary projection of a pulsed light, and wherein said main control device produces a selection signal which selects said laser scanners per each light emission of the pulsed light, said laser scanner, which is alternately selected based on said selection signal, performs distance measurement by emitting the pulsed light, wherein said laser scanner, which receives a reflected pulsed light from one projecting point and performs distance measurement at the same time, is a selected one, wherein said laser scanner has a distance measuring unit, and wherein said distance measuring unit has a light emitting source for emitting the pulsed light and a distance measuring light detector for receiving a reflection light for an object to be measured, and said distance measuring unit makes said light emitting source to emit based on said selection signal, and said main control device carries out maskings with respect to said distance measuring light detector so as to detect, with respect to each of said laser scanners, only said reflection light of the pulsed light as emitted by themselves.

* * * * *